United States Patent
Storbeck et al.

(10) Patent No.: US 6,595,461 B1
(45) Date of Patent: *Jul. 22, 2003

(54) ADHESIVE TAPE

(75) Inventors: Reinhard Storbeck, Hamburg (DE); Uwe Wienberg, Uetersen (DE); Markus Eikmeier, Hamburg (DE); Andreas Wieck, Halstenbek (DE)

(73) Assignee: tesa AG, Hamburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/490,709

(22) Filed: Jan. 24, 2000

(51) Int. Cl.⁷ .............................. B65H 19/10; C09J 7/02
(52) U.S. Cl. .................... 242/556.1; 242/556; 428/354; 428/343; 428/40.1; 428/42.2; 156/304.1
(58) Field of Search .............................. 242/556.1, 556; 428/354, 343, 40.1, 42.2; 156/304.1

(56) References Cited

U.S. PATENT DOCUMENTS

| | | | | |
|---|---|---|---|---|
| 5,212,002 A | * | 5/1993 | Madrzak et al. | 428/40 |
| 5,702,555 A | * | 12/1997 | Caudal et al. | 156/247 |
| 5,901,919 A | * | 5/1999 | Wienberg | 242/556.1 |
| 5,916,651 A | * | 6/1999 | Wienberg et al. | 428/40.1 |

FOREIGN PATENT DOCUMENTS

| | | |
|---|---|---|
| DE | 195 44 010 A1 | 5/1997 |
| DE | 196 28 317 A1 | 1/1998 |
| EP | 0418527 A2 * | 4/1990 |

OTHER PUBLICATIONS

EP 418527A Abstract (English), Mar. 1991.*
Abstract—DE 19544010.

* cited by examiner

Primary Examiner—Daniel Zirker
(74) Attorney, Agent, or Firm—Norris McLaughlin & Marcus

(57) ABSTRACT

Adhesive tape with adhesive front side and non-adhesive rear side and two long edges for a flying reel change, having a) a paper carrier (P1), which is coated on one side—the front side—with a self-adhesive compound (N1), b) part of the non-adhesive rear side of the paper carrier (P1) being equipped with a double-sided adhesive tape (DO) which has, on one side, a paper carrier (P2) of cleavable paper coated on both sides with self-adhesive compound (N2, N3), characterized in that c) the double-sided adhesive tape (DO) is arranged at a distance (V) of 0.5 to 15 mm from one long edge (LK) of the adhesive tape.

16 Claims, 1 Drawing Sheet

ADHESIVE TAPE

The invention relates to an adhesive tape for a flying reel change and to a splice method using such an adhesive tape, especially in paper converting machines, printing machines and the like.

The flying reel change is a common method, in paper mills or the like, to replace an old paper reel which has almost been unwound by a new one without having to stop the high-speed machines. In this case, double-sided self-adhesive tapes, so-called tabs, are used, which on the one hand are highly sticky and tacky but, on the other hand, because of their water-soluble self-adhesive compounds and paper carriers are not disruptive when the paper waste is reused in the papermaking machine. These tabs are stuck in an elaborate way in zig-zag form at the web start, a procedure which demands experienced specialist personnel, there remaining only about 4–5 minutes for the entire operation because of the high-speed machine.

Although this technology is tried and tested, it has some disadvantages. Thus, specialist personnel are needed, there is always frantic activity, and the bonds are also relatively thick, since in each case two paper layers and the adhesive tab between them are the result: a result which is not desired in the paper industry.

For this "pointed bonding" during a flying reel change, there are diverse products on the market, so-called tabs, which, in addition to a paper carrier, have a water-soluble self-adhesive compound coated on both sides. Such adhesive tapes are on the market, inter alia under the designation tesafix (Beiersdorf).

Numerous adhesive tapes for such purposes are described in the prior art. Thus, EP 418 527 A2 discloses a method of preparing a reel of web-like printing material for automatic reel changes and an adhesive strip suitable for this purpose. DE 40 33 900 A1 also describes an adhesive tape suitable for a splice point. However, adhesive areas which are exposed after a splicing method has been carried out are disadvantageous.

The non-adhesive covering of otherwise exposed adhesive areas is taught by U.S. Pat. No. 5,702,555 for more static loadings while securing a reel start, while DE 196 32 689 A2 discloses such an adhesive tape for dynamic loading during a splicing method, whose paper carrier cleaves and, with its remains, covers the adhesive compounds.

Also of this type is an adhesive tape according to DE 196 28 317 A1, likewise for a splicing method. This adhesive tape bears, on its non-adhesive rear side, a double-sided adhesive tape (6), which has a paper carrier (7) which is suitable for splicing and which cleaves (7a, 7b, FIG. 3) during the splicing method and covers the respective adhesives. This double-sided adhesive tape (6) ends at one side with one side of the paper carrier (2), is therefore arranged along one of the long edges of the adhesive tape.

In practice, these adhesive tapes also exhibit disadvantages, primarily because a splice does not succeed, but rather ends as a break, without any reason for this being visible.

The object of the invention was to provide a remedy here.

This is achieved by an adhesive tape and a splicing method as is characterized in more detail in the claims. In order to avoid repetitions, reference is expressly made to the claims, especially also to relevant preferred embodiments.

According to the invention, splices succeed without breaks, the central feature constituting the offset or the distance V provided of the double-sided adhesive tape DO from the long edge LK of the adhesive tape. This success by comparison with the prior art is shown by reference by comparative trials, which are presented in the table.

Cleavable Paper

The cleavable paper advantageously has a distinctly lower cleavage resistance than the paper carrier which has to accommodate the tensile forces. An adequate difference is helpful for the functional principle of the product according to the invention.

The cleavable papers considered are, for example, the following papers or paper composite systems:

Duplex papers: These papers are commercially available and are used, for example, in the manufacture of filter materials and wall coverings.

Easily cleavable papers: The adjustment of the cleavage work is carried out via the consolidation of the paper fibre structure. The lower the consolidation, the lower the cleavage work.

Suitable paper types are, for example, machine-finished papers calendered on one side or else highly-calendered kraft papers.

Sized paper systems: The cleavage work is adjusted via the chemistry of the adhesive size. The size should have penetrated into the paper only to an insignificant extent.

Clean cut edges are also helpful for the aims of the present invention. During the cutting operation, no compound should be squeezed out. In particular, the cleavable attachment area of the cleavable material should not be covered by contact adhesive compound.

The amount by which the cleavable material is set back, or the distance V, should be 0.5–15 mm according to the invention, especially 1–7 mm and quite particularly 1.5 mm–3.5 mm.

Diverse cleavable paper systems are considered for the cleavable paper, such as

Duplex papers (papers laminated together in a defined manner), the cleavage process proceeds extremely homogeneously, no stress peaks are produced, for example as a result of inhomogeneous consolidation. These papers are used for the manufacture of wall coverings and filters.

Easily cleavable paper systems

Highly consolidated papers sized together in a defined way ($\Rightarrow$ papers with a high cleavage strength). Sizing can be carried out, for example, with starch, starch-containing derivatives, wall covering adhesives based on methylcellulose (Methylan ®, Henkel KGaA, Düsseldorf) or else based on polyvinyl alcohol derivatives.

The width of the carrier of the cleavable paper is preferably 3–20 mm, especially 6–12mm.

The invention relates in one embodiment to an adhesive tape, characterized in that a slit (SC) is arranged at a distance of 20 to 40 mm from that of a long edge (LK 2) of the adhesive tape which is opposite a long edge (LK1) close to which the doublesided adhesive tape (DO) is arranged. The double-sided adhesive tape (DO) is 3 to 20 mm wide, especially 6 to 12 mm wide.

All basic types of contact adhesive compound are considered as the self-adhesive compounds, especially acrylates (water-soluble and non-water-soluble)

natural rubber compounds, synthetic rubber compounds

The invention relates in one embodiment to a splicing method, in which an adhesive tape is partly stuck behind the top paper web of a reel of paper, while the double-sided adhesive-tape on the rear side of the adhesive tape is for its part stuck to the paper web beneath it and therefore secures the top paper web, firstly only part of the release material possibly located on the self-adhesive compound being pulled off, so that that part of the self-adhesive compound needed for the splicing method is still covered by release material and, in this state, the paper reel has no free adhesive area, after which, in order to prepare the splicing method finally, any remaining release material still present is removed, whereupon the new paper reel equipped in this way is placed beside an old paper reel which has been almost completely unwound and is to be replaced, and is accelerated to the same peripheral speed as tbe said old reel, is then pressed against the old paper web, the exposed self-adhesive compound of the adhesive tape sticking to the old paper web at essentially equal speeds of the paper webs, while at the same time the paper carrier of cleavable paper cleaves and, with its remains, covers both self-adhesive compounds which were coated on the said paper carrier, so that they are non-adhesive.

The splicing method, here the sticking using the splicing tape, can in particular be carried out in such a way that the adhesive tape is stuck to the running web at right angles (disadvantage: the cleavable paper system must cleave completely into secondary fractions), but also at an acute angle (advantage: the cleaving process runs as a wave through the adhesive tape), especially up to 25°, above all up to 15°.

BRIEF DESCRIPTION OF THE DRAWINGS

The invention will now be described in greater detail with reference to the drawings, wherein

As shown in FIG. 1, the adhesive tape has
a) a paper carrier (P1), which is coated on one side—the front side—with a self-adhesive compound (N1),
b) part of the non-adhesive rear side of the paper carrier (P1) being equipped with a double-sided adhesive tape (DO) which has, on one side, a paper carrier (P2) of cleavable paper coated on both sides with self-adhesive compound (N2, N3), characterized in that
c) the double-sided adhesive tape (DO) is arranged at a distance (V) of 0.5 to 15 mm from one long edge (LK) of the adhesive tape.

Figure 1:
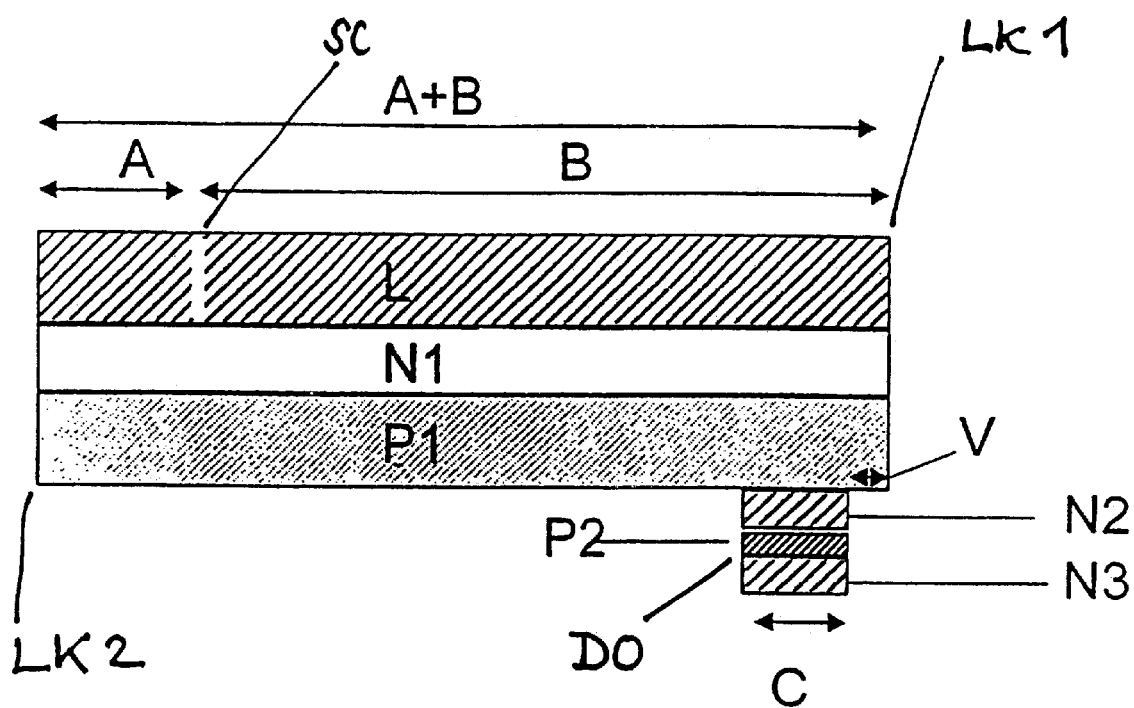
FIG. 1 is a schematic illustration of an adhesive tape according to the invention in cross-section.

The self-adhesive compound (N1) is covered by release material (L). The release materal (L) is provided with a slit (SC). "A+B" designates the distance from the second long edge (LK2) to the first long edge (LK1). "A" alone represents the distance from the second long edge (LK2) to the slit (SC). "B" alone represents the distance from the slit (SC) to the first long edge (LK1). "C" represents the distance between both edges of the double-sided adhesive tape (DO).

Test Methods
Measuring the Cleavage Strength (Internal Bond Strength) of Papers
Purpose and Area of Application
  Testing the strength of paper or other materials built up from fibres in the Z direction.
  The cleavage strength is determined.
  The cleavage strength is the force which has to be overcome in order to cleave a paper element in the Z direction.
Principle of the Method
  Two adhesive tapes are applied to the paper to be tested, located opposite each other, and are pulled apart at an angle of 180° C. in the tensile testing machine. The force to be overcome in order to cleave the paper is the cleavage strength.

Instruments and Atmospheric Testing Conditions
  Tensile testing machine
  Blade or strip cutter 15 mm wide
  Hand-held roller 2 kg
  Atmospheric testing conditions: 23+/−1° C., 50+/−5% relative humidity
Materials
  Adhesive tape, such as test tape 7475
  Width 20 mm, strips about 20 cm long
Test Samples
  DIN A4 sheets
  The samples must be conditioned for at least 16 hours under standard atmosphere conditions.
Carrying Out the Test
  Two adhesive tapes are placed on the paper to be tested from both sides, located opposite each other, and are smoothed lightly with a finger in order to avoid air inclusion.
  The hand-held roller is then used to roll the composite twice on both sides, in order to achieve a satisfactory adhesive strength.
  The bond is to be produced in such a way that on one side, the ends of the adhesive tape project beyond the test element and, by being folded, can be stuck to each other to form a grip.
  The testing direction may be the running direction or transverse to the running direction of the test element, depending on the aim of the test.
  Using a steel rule, strips of a length of about 20 cm and 15 mm width are cut centrally from the composite. The two grips of the projecting adhesive tape are then pulled apart by hand until cleavage of the paper specimen can be detected.
  The test element is then clamped into the tensile testing machine by the grips, freely suspended at the top and the bottom, and the rest of the strip is pulled apart at a constant speed of 300 mm/min.
  In the case of very thin papers, care should be taken that the result is not falsified by the fact that the opposite edges of the adhesive strip have contact with the edge of the test element and stick to it.
Evaluation and Assessment
  The cleavage strength of the paper is specified in cN/cm.
  The average of 5 values determined is specified.
  The cleavage strength of the paper carrier (P2) is 20 to 70 cN/cm, especially 22 to 60 cN/cm, quite particularly 25 to 50 cN/cm.
Application Examples
  The following examples describe trial products tried out for a flying reel change, the splicing conditions and the splicing results. The product constructions tried are illustrated in Table 1.
  The drawing describes the associated product construction.

DESCRIPTION OF THE PAPER SYSTEMS USED:

The following coating base papers were used for the splicing trials:
  [A] Coating base paper (grammage 33 g/m$^2$, thickness 58 μm) e.g.: Stora Kabel GmbH, 58099 Hagen
  [B] Coating base paper (grammage 60 g/m$^2$, thickness 80 μm ) e.g.: Stora Uetersen GmbH, 25436 Uetersen
  [C] Coating base paper (grammage 134 g/m$^2$, thickness 167 μm ) e.g.: Sappi Alfeld AG, 31061 Alfeld The following cleavable papers were used for the trial products:

[D] Duplex filter paper
  Grammage 51 g/m², thickness 90 μm
  Cleavage work, transverse 34–44 cN/cm
[E] Machine-finished paper calendered on one side
  Grammage 57 g/m², thickness 74 μm
  Cleavage work, transverse 33–38 cN/cm
[F] Highly calendered kraft paper
  Grammage 50 g/m², thickness 57 μm
  Cleavage work, transverse 40–45 cN/cm
[G] Sized paper composite system with a defined cleavage work.

[H] Machine-calendered base paper
  Grammage 54 g/m², thickness 66 μm, maximum transverse tensile strength 40 N/15 mm
[I] one-side-coated calendered base paper
  Grammage 59 g/m², thickness 52 μm, maximum transverse tensile strength 30 N/15 mm
[J] Two-side-coated, consolidated, printable décor paper
  Grammage 80 g/m², thickness 62 μm, maximum transverse tensile strength 30 N/15 mm
[K] One-side-double-coated, woodfree, high-gloss kraft paper
  Grammage 63 g/m², thickness 51 μm, maximum transverse tensile strength 30 N/15 mm

TABLE 1

Summary of the technical data on the trial products and trial parameters used.

| Trial parameters | Unit | Drawing | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|---|
| Width A + B | mm | A + B | 75 | 75 | 75 | 75 | 80 | 80 | 75 | 75 | 75 | 75 | 75 |
| Width A | mm | A | 25 | 25 | 25 | 25 | 30 | 30 | 25 | 25 | 25 | 25 | 25 |
| Width B | mm | B | 50 | 50 | 50 | 50 | 50 | 50 | 50 | 50 | 50 | 50 | 50 |
| Width C | mm | C | 12 | 12 | 12 | 12 | 9 | 9 | 6 | 9 | 9 | 9 | 9 |
| Thickness of release material 1) | μm | L | 90 | 90 | 90 | 90 | 90 | 90 | 90 | 90 | 90 | 90 | 90 |
| Release material pull-off force 2) | cN/cm | L | 4 | 4 | 4 | 4 | 4 | 4 | 4 | 4 | 4 | 4 | 4 |
| Application to carrier paper 3) | g/m² | N 1 | 50 | 50 | 55 | 55 | 55 | 60 | 50 | 50 | 50 | 50 | 50 |
| Type of carrier paper (type) | g/m² | P 1 | H | H | H | H | K | J | I | H | H | H | H |
| Thickness of carrier paper (CP) 1) | μm | P 1 | 66 | 66 | 66 | 66 | 51 | 62 | 52 | 66 | 66 | 66 | 66 |
| Maximum transverse tensile force (CP 4) | N/15 mm | P 1 | 40 | 40 | 40 | 40 | 30 | 30 | 30 | 40 | 40 | 40 | 40 |
| Application to cleavable paper 3) | g/m² | N 2 | 30 | 30 | 30 | 30 | 30 | 30 | 30 | 30 | 30 | 30 | 35 |
| Type of cleavable paper (type) | g/m² | P 2 | D | D | F | F | E | F | D | D | D | D | G |
| Cleavage strength of cleavable paper 5) | cN/cm | P 2 | 34–44 | 34–44 | 40–45 | 40–45 | 33–38 | 40–45 | 34–44 | 34–44 | 34–44 | 34–44 | 28–32 |
| Application to cleavable paper 3) | g/m² | N 3 | 30 | 30 | 30 | 30 | 30 | 30 | 30 | 30 | 30 | 30 | 35 |
| Offset | mm | V | 0 | 1.5 | 0 | 2 | 1 | 2 | 2 | 2 | 0 | 2 | 1.5 |
| Parameters of splicing trials | | | | | | | | | | | | | |
| Paper (type) to be spliced | g/m² | | B | B | B | B | A | B | C | B | B | C | C |
| Web speed | m/min | | 1200 | 1200 | 1200 | 1200 | 800 | 1200 | 1200 | 540 | 540 | 950 | 800 |
| Splicing angle 6) | ° | | 0 | 0 | 0 | 0 | 0 | 0 | 0 | 10 | 5 | 5 | 5 |
| Working width | cm | 100 | 100 | 100 | 100 | 100 | 100 | 100 | 100 | 160 | 160 | 375 | 100 |
| Results of the splicing trials | | | | | | | | | | | | | |
| Splicing successful | | | | X | | X | X | X | X | X | | X | X |
| Splicing failed | | | X | | X | | | | | | X | | |

1) Thickness to DIN EN 20534, d = 16 mm, 20 N
2) Pull-off force to FINAT FTM 3
3) Application of compound to FINAT FTM 12
4) Maximum transverse tensile strength to DIN EN ISO 1924.2 (300 mm/min, 100 mm clamped length)
5) Cleavage strength measurement method as described in text
6) Splicing angle: right angles (= 0°) to approximately a right angle (= max 15°) to the running paper web.

Two machine-calendered base papers were bonded together using a size containing starch. Grammage in each case 54 g/m², thickness 66 μm. The cleavage work of the composite, transverse was 28–32 cN/cm.

The following carrier papers were used for the trial products:

What is claimed is:
1. A splicing tape comprising:
   a) a paper carrier having a front side and a rear side and two long edges;
   b) a self-adhesive compound on said front side of said paper carrier; and c) a double-sided adhesive tape adhered to a part of said rear side of said paper carrier, said double sided adhesive tape being adhered to said rear side beginning at a distance V of from 0.5 to 15 mm from one long edge of said paper carrier, wherein said double-sided adhesive tape comprises:
   i) a cleavable paper carrier;
   ii) a self-adhesive compound on a first side of said cleavable paper carrier, and
   iii) a self-adhesive compound on a second side of said cleavable paper carrier.

2. Adhesive tape according to claim 1, wherein the distance V is 1 to 7 mm.

3. Adhesive tape according to claim 1, wherein the distance V is 1.5 to 3.5 mm.

4. Adhesive tape according to claim 1, wherein one or more of the self-adhesive compounds are contact adhesive compounds based on acrylates or rubber.

5. Adhesive tape according to claim 1, wherein one or more of the self-adhesive compounds are water-soluble contact adhesive compounds based on acrylates.

6. Adhesive tape according to claim 1, wherein the self-adhesive compound on the front side of the paper carrier is covered by a release material.

7. Adhesive tape according to claim 6, wherein the release material is provided with a slit.

8. Adhesive tape according to claim 7, wherein the slit is arranged at a distance of 20 to 40 mm from a long edge of the adhesive tape which is opposite the long edge closest to an edge of the double-sided adhesive tape.

9. Adhesive tape according to claim 1, wherein the double-sided adhesive tape is 3 to 20 mm wide.

10. Adhesive tape according to claim 9, wherein the double-sided adhesive tape is 6 to 12 mm wide.

11. Adhesive tape according to claim 1, wherein the cleavable paper carrier has a cleavage strength of 20 to 70 cN/cm.

12. Adhesive tape according to claim 11, wherein the cleavable paper carrier has a cleavage strength of 22 to 60 cN/cm.

13. Adhesive tape according to claim 11, wherein the cleavable paper carrier has a cleavage strength of 25 to 50 cN/cm.

14. A splicing method comprising the following steps:
   a) providing a splicing tape according to claim 13;
   b) providing a new reel of paper having a top web of paper and another web of paper beneath said top web of paper;
   c) adhering part of the self-adhesive compound on the front side of the paper carrier of said splicing tape to an underside of said top web of paper;
   d) adhering the double-sided adhesive tape of said splicing tape to an topside of said web of paper beneath said top web of paper;
   e) placing said new reel of paper beside an unwinding reel of paper;
   f) accelerating said new reel of paper to the same speed as said unwinding reel of paper;
   g) pressing said new reel of paper against said unwinding reel of paper so that:
      i) an unadhered part of the self-adhesive compound on the front side of the paper carrier of said splicing tape becomes adhered to said unwinding reel of paper, thereby to form a splice between said new reel of paper and said unwinding reel of paper; and
      ii) said cleavable paper cleaves in a such way that upon cleavage remains of said cleavable paper cover both self-adhesive compounds on said cleavable paper and render both self-adhesive compounds outwardly non-adhesive.

15. The splicing method according to claim 14, wherein the adhesive tape is bonded to the unwinding reel of paper at right angles or else at an acute angle of up to 25°.

16. The splicing method according to claim 15, wherein the adhesive tape is bonded to the unwinding reel of paper at right angles or else at an acute angle of up to 15°.

* * * * *